(12) United States Patent
Wexler et al.

(10) Patent No.: US 7,805,066 B2
(45) Date of Patent: Sep. 28, 2010

(54) SYSTEM FOR GUIDED PHOTOGRAPHY BASED ON IMAGE CAPTURING DEVICE RENDERED USER RECOMMENDATIONS ACCORDING TO EMBODIMENTS

(75) Inventors: Yonatan Wexler, Redmond, WA (US); Eyal Ofek, Redmond, WA (US); Boris Epshtein, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 185 days.

(21) Appl. No.: 11/963,849

(22) Filed: Dec. 24, 2007

(65) Prior Publication Data

US 2009/0162042 A1 Jun. 25, 2009

(51) Int. Cl.
G03B 17/00 (2006.01)
G03B 17/48 (2006.01)
G03B 19/00 (2006.01)
G03B 29/00 (2006.01)

(52) U.S. Cl. ........................................ 396/49; 396/429
(58) Field of Classification Search .................. 396/49, 396/429
See application file for complete search history.

(56) References Cited

U.S. PATENT DOCUMENTS

| | | | |
|---|---|---|---|
| 4,668,991 A | 5/1987 | Theuwissen et al. | |
| 4,878,183 A | 10/1989 | Ewart | |
| 6,292,228 B1 | 9/2001 | Cho | |
| 6,459,388 B1 * | 10/2002 | Baron | 340/996 |
| 6,459,825 B1 | 10/2002 | Lippincott | |
| 6,516,154 B1 * | 2/2003 | Parulski et al. | 396/287 |
| 7,023,468 B2 | 4/2006 | Chikahisa et al. | |
| 7,277,575 B2 | 10/2007 | Baqai et al. | |
| 2001/0048815 A1 * | 12/2001 | Nakajima et al. | 396/310 |
| 2003/0063194 A1 | 4/2003 | Nishiyama et al. | |
| 2003/0169350 A1 | 9/2003 | Wiezel et al. | |
| 2004/0151491 A1 * | 8/2004 | Coleman et al. | 396/376 |
| 2005/0041839 A1 | 2/2005 | Saitou et al. | |
| 2005/0088542 A1 * | 4/2005 | Stavely et al. | 348/239 |
| 2006/0140463 A1 | 6/2006 | Rutschmann | |
| 2006/0221229 A1 | 10/2006 | Ogawa et al. | |
| 2007/0025723 A1 * | 2/2007 | Baudisch et al. | 396/287 |

FOREIGN PATENT DOCUMENTS

| | | |
|---|---|---|
| KR | 1020060024093 A | 3/2006 |
| KR | 1020060032247 A | 4/2006 |

(Continued)

OTHER PUBLICATIONS

Davis, et al., "From Context to Content: Leveraging Context to Infer Media Metadata", Date: Oct. 2004, pp. 1-8.

(Continued)

Primary Examiner—W. B. Perkey
Assistant Examiner—Noam Reisner
(74) Attorney, Agent, or Firm—Capitol City TechLaw; Richard C. Irving

(57) ABSTRACT

Guided photography with image capturing device rendered user recommendations. Data is accessed that is associated with an intended photograph. A knowledge base is accessed to obtain data that is related to the data that is associated with the intended photograph. Recommendations are determined for the intended photograph based on the knowledge base data. The recommendations are provided to a rendering system of the device before the intended photograph is taken.

20 Claims, 6 Drawing Sheets

FOREIGN PATENT DOCUMENTS

WO 0004711 A1 1/2000

OTHER PUBLICATIONS

Davis, et al. "Mobile Media Metadata for Mobile Imaging", pp. 1-4, Date: 2004.

Hakansson, et al. "Capturing the Invisible: Designing Context-Aware Photography", Date: 2003, pp. 1-5.

PCT/US2008/084777, International Search Report and Written Opinion for PCT application corresponding to the present application, mailed Jul. 3, 2009.

\* cited by examiner

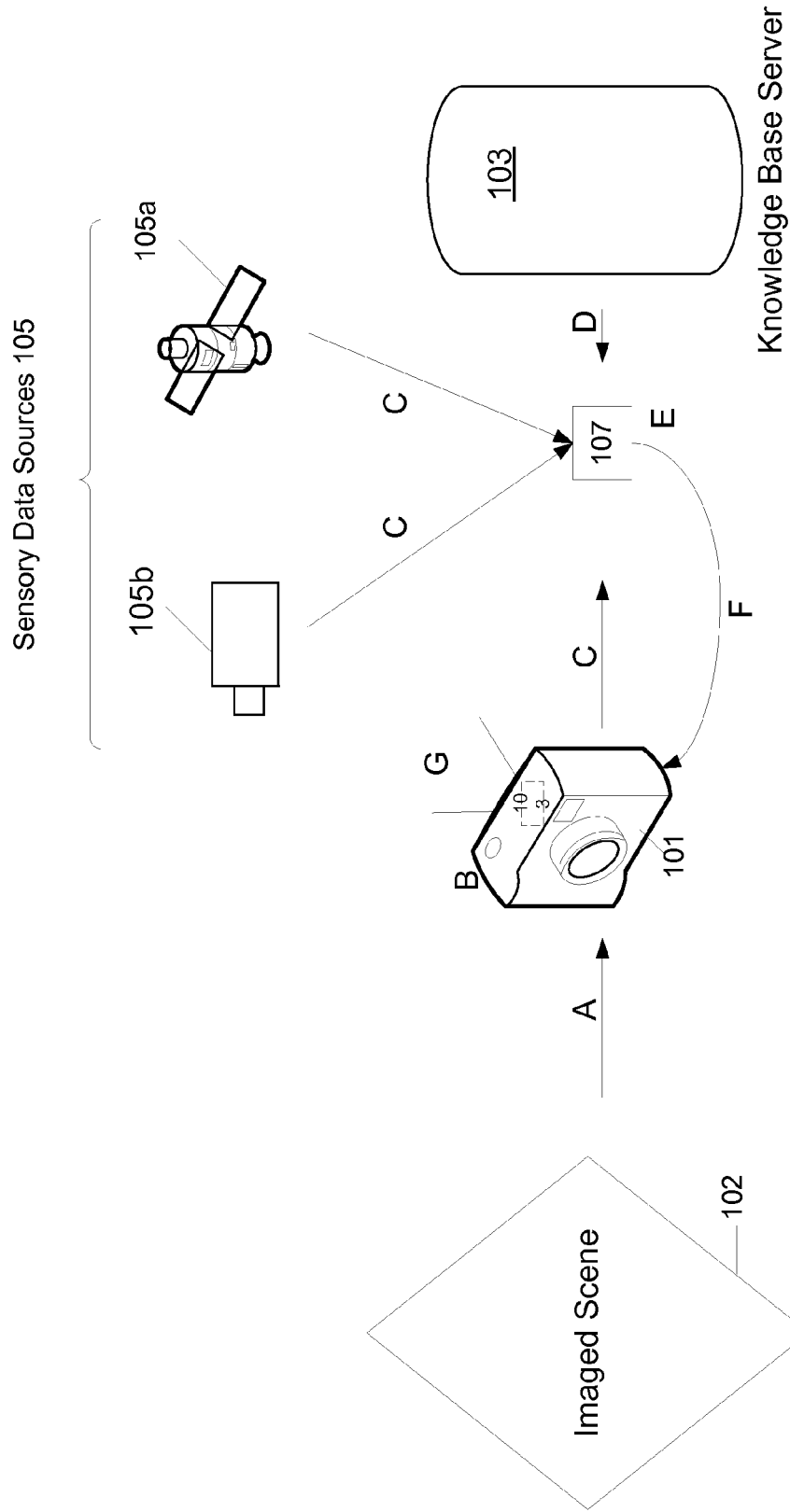

SYSTEM FOR GUIDED PHOTOGRAPHY BASED ON IMAGE CAPTURING DEVICE RENDERED USER RECOMMENDATIONS ACCORDING TO EMBODIMENTS

TECHNICAL FIELD

Embodiments pertain to improving photography.

BACKGROUND

Photography is the process of recording images though the capture of light onto a light-sensitive medium, such as a film or an electronic sensor. As a part of the process, light patterns reflected or emitted from objects are allowed to expose a sensitive silver halide based chemical or an electronic medium during a timed exposure. The light patterns can be captured through the photographic lens of a camera, which depending on its type can store the captured images chemically or electronically. The captured images are used to produce photographs that contain the captured images.

Once a photograph is produced the images contained therein can be modified through image editing processes. Traditional analog image editing is also known as photo retouching, and involves the usage of tools such as an airbrush to modify photographs. However, since the advent of digital images, analog image editing has become largely obsolete. Graphic software programs, which can be broadly grouped into vector graphics editors, raster graphics editors, and 3D modelers, are the primary tools with which a user may manipulate, enhance, and transform images.

Conventional image editing techniques are used to alter the appearance of photographic images after a photograph has been taken. Accordingly, the effectiveness of such techniques can be limited because basic quality deficits in a photograph that are attributable to the lack of skill and experience of the photograph taker may not be solvable by conventional image editing and currently cannot be addressed using conventional cameras.

The quality of photographs taken by the average photograph taker is directly impacted by the knowledge and ability that the photograph taker brings to the task of taking a photograph. A lack of photographic knowledge is generally reflected in the difference in quality that is observable between a photograph that is taken by the average photograph taker and a photograph that is taken by a skilled and experienced photographer.

Given the great sentimental value placed on some photographs, missed photographic opportunities can be very undesirable. Conventional cameras provide users with very limited guidance that can ensure that fleeting photographic opportunities are not lost. As such, conventional cameras provide inadequate systems for supporting the photographic aspirations of the average photograph taker who possesses average photograph taking skills and who desires to maximize the quality of the photographs that they are preparing to take.

SUMMARY

This Summary is provided to introduce a selection of concepts in a simplified form that are further described below in the Detailed Description. This Summary is not intended to be used to limit the scope of the claimed subject matter.

Guided photography with image capturing device (e.g., camera, cellular phone) rendered user recommendations is disclosed. As a part of the guided photography, the device consults a knowledge base in order to provide recommendations either before or during the taking of a photograph. In an embodiment, data that is associated with an intended photograph (e.g., device type, existing camera parameters, the image that the intended photograph is based on) is accessed. Thereafter, a knowledge base (e.g., a store of existing photographs and photograph related information) is accessed to obtain data that is related to the data that is associated with the intended photograph. Based on the obtained data, recommendations (e.g., suggestions to change vantage point, add additional objects, adjust lighting, etc., of the intended photograph) are determined for the intended photograph. The recommendations are provided to a rendering system of the image capturing device for rendering before (and in some cases during) the taking of the intended photograph, for example, to video display systems of the image capturing device to be displayed graphically on a viewfinder or to audio output systems of the image capturing device that render audio outputted recommendations.

BRIEF DESCRIPTION OF THE DRAWINGS

The accompanying drawings, which are incorporated in and form a part of this specification, illustrate embodiments and, together with the description, serve to explain the principles of the embodiments:

FIG. 1B illustrates operations A-G performed in a guided photography process according to one embodiment.

The drawings referred to in this description are for illustration only and should not be understood as being drawn to scale except if specifically noted.

DETAILED DESCRIPTION

Reference will now be made in detail to various embodiments, examples of which are illustrated in the accompanying drawings. While descriptions will be provided in conjunction with these embodiments, it will be understood that the descriptions are not intended to limit the scope of the embodiments. On the contrary, the disclosure is intended to cover alternatives, modifications and equivalents, of these embodiments. Furthermore, in the following description, numerous specific details are set forth in order to provide a thorough understanding of embodiments. In other instances, well-

Figure 1A:
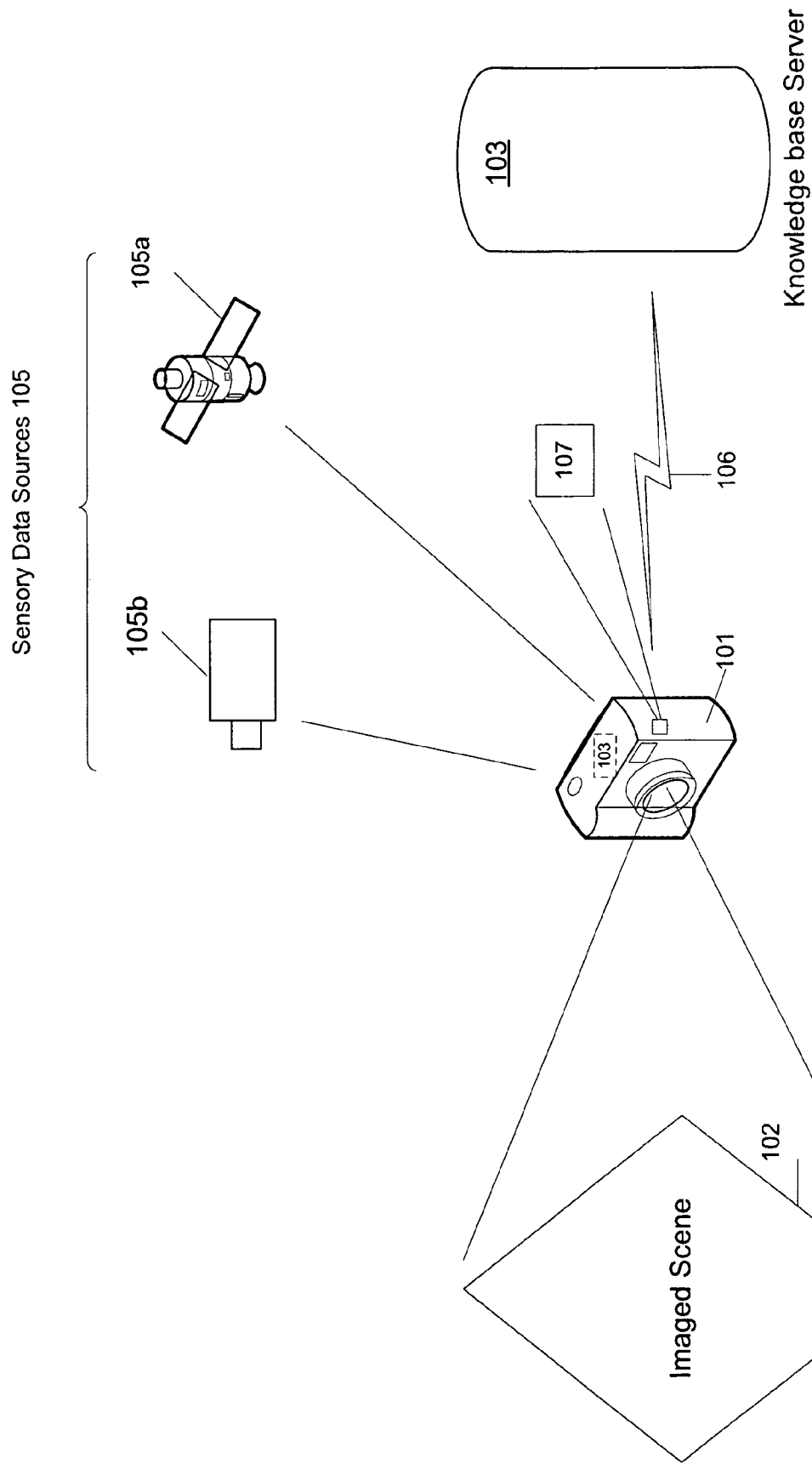
FIG. 1A is a diagram of an exemplary operational setting of a system for guided photography based on image capturing device rendered recommendations according to one embodiment.

Exemplary Network Setting of a System for Guided Photography Based on Image Capturing Device Rendered User Recommendations According to Embodiments FIG. 1A shows an exemplary operational setting of a system 107 for guided photography based on image capturing device rendered recommendations according to one embodiment. System 107 provides in situ recommendations for taking a photograph to camera users based on information that is obtained from a knowledge base server 103. FIG. 1A shows an image capturing device 101, imaged scene 102, knowledge base server 103, sensory data sources 105, network link 106 and system 107. In the FIG. 1A embodiment, sensory data sources 105 include but are not limited to global positioning satellite (GPS) devices 105a and camera monitors 105b.

Referring to FIG. 1A, image capturing device 101 (e.g., camera, camera phone, camcorder, etc.) images a scene 102 and provides feedback in the form of recommendations that are based upon available information related to the imaged scene 102 (or to a collection or sequence of imaged scenes such as for a movie or video). In one embodiment, recommendations can suggest possible changes in image capturing device 101, location, parameters settings and/or scene in order to improve the quality of a photograph that is intended. In one embodiment, recommendations are determined by system 107, which can be resident at image capturing device 101 or other locations (see FIG. 2 and accompanying discussion). In one embodiment, image capturing device 101 can include a resident knowledge base server 103 or elements thereof (see dashed lined structure 103 in FIG. 1A). In other embodiments, knowledge base server 103 can reside at a location separate from image capturing device 101 (see also FIG. 1A).

System 107 can determine one or more recommendations for the improvement of an intended photograph (e.g., a "would be" photograph that an image capturing device user indicates that they intend to take such as by depressing a button partially) based upon information that it obtains from knowledge base server 103. In one embodiment, the information obtained from knowledge base server 103 is based upon information that is related to the intended photograph that includes the content of the intended photograph (e.g., the imaged scene or collection of scenes) and the parameters of image capturing device 101 at the instant that a desire to take a photograph of an imaged scene 102 is signaled (such as image capturing device type, location, orientation, time and date). In one embodiment, the aforementioned information is accessed by system 107 which then initiates a search of knowledge base 103 for related information such as stored photographs that suggest possible improvements to the intended photograph. In one embodiment, based on information accessed from knowledge based server 103, recommendations can be made before and/or during (e.g., "your hands are unsteady") the taking of a photograph.

For example, if an intended photograph that includes a well known structure (e.g., Golden Gate Bridge, Chrysler Building, etc.) is to be taken from a specific location at a specific time, system 107 can access (e.g., via a search) the knowledge base 103 which includes information related to the well known structure and based thereupon provide recommendations (e.g., change vantage point, lighting etc.). For instance, system 107 can recommend that changes be made that would impart qualities or features to the intended photograph that are possessed by the accessed photograph or photographs (e.g., famous photograph or photographs of the Golden Gate Bridge, Chrysler Building, etc., for example taken by a framed photographer). More specifically, based on accessed information that is provided by a search of knowledge base server 103, system 107 can recommend that an intended photograph of the well known structure be taken from the same vantage point and at the same time as was done in an accessed photograph. In this manner, a photograph of the well known structure can be produced that possesses desired qualities or features that are similar to those possessed by the accessed photograph.

In one embodiment, system 107 can provide the aforementioned recommendations to tactile, audio or visual presentation systems of camera 101 for presentation to a user of image capturing device 101. Based on the recommendations a user of image capturing device 101 can (continuing with the above example case) change the vantage point of an intended photograph and the time when the intended photograph is intended to be taken (e.g., to be consistent with the vantage point and time taken, of an accessed famous photograph).

Sensory data sources 105 provide real time data upon which recommendations for improvement of photographs can be based. In one embodiment, such real time data can include but is not limited to information from a GPS system 105a and/or a camera monitor 105b (or cellular phone tower etc.). In one embodiment, this information can be included in the package of information that is used to identify information (e.g., stores of existing photographs) in knowledge base 103 upon which recommendations are based.

In one embodiment, real time data acquired from a sensory data source 105 such as a motion detection device can be used to assist photograph takers in the taking of a photograph. For example, the timing of a specific photographic shot can be based on motion detection. For instance, during a football game, a motion detection device can highlight the possible areas of activity or the precise timing of a kick. In one embodiment, the possible areas of activity can be deduced by users on the network, by some other server side action (such as knowledge base server 103) or by other information sources and providers.

As discussed above, knowledge base server 103 contains information that is used to determine recommendations. In one embodiment, knowledge base server 103 stores information such as previously taken photographs from which information can be derived such as vantage point, lighting, content etc., and as discussed above, this information can be accessed via network link 106 by system 107 and used to determine recommendations for the improvement of an intended photograph. In one embodiment, network link 106 can include but is not limited to the Internet, WANs, LANs etc. Also, in one embodiment, it should be appreciated that knowledge base server 103 may connect to other information sources (e.g. to get sunset times or other "live" information).

Exemplary Knowledge Base Related Recommendations

In one embodiment, an exemplary process performed by system 107 to determine recommendations for a "proposed" or "intended" photograph based on information accessed from knowledge base server 103 can include: (1) identifying photographs in knowledge base server 103 that have a particular type of content similarity with the intended photograph, (2) identifying desirable qualities or features of the identified photographs such as their vantage point, lighting, composition, etc., that are different from their counterparts in the proposed photograph and (3) framing the identified desirable qualities or features as recommendations for an intended photograph that are presented to a user.

Exemplary recommendations provided by system 107 based on information accessed from knowledge base server 103 can result in a changing of the direction and/or amount of flash that is used to take an intended photograph, adding an additional object or objects to the intended photograph (to balance the composition of the intended photograph) and/or a changing of camera parameters (focus/exposure) to achieve a desired appearance. Exemplary recommendations provided by system 107 based on information accessed from knowledge base server 103 are discussed in detail below.

In one embodiment, knowledge base server 103 can include a data base of buildings and geometry. In one embodiment, using the database of buildings and geometry that is a part of knowledge base server 103 some obstacles can be made semi-transparent in the viewfinder of camera 101, in order to show what is occluded to aid a photograph taker in deciding what to include. In one embodiment, available photographs and knowledge related to the photographs can be used to assist a photograph taker. For example, the device can use the knowledge to highlight occluders that hide the subject, such as random people or tree branches that the photographer did not notice.

In one embodiment, knowledge base server 103 can include a data base of known 3D geometry. In one embodiment, the database of known 3D geometry that is a part of knowledge base server 103 can be utilized to provide recommendations related to image capture. For example, in one embodiment, known 3D geometry can be used to simulate a view from a suggested point, in order to simulate the lighting conditions at the suggested time and to suggest a good point from which to photograph a certain location based on occlusion, accessibility and distance.

In one embodiment, knowledge base server 103 can include a data base of available photographs. In one embodiment, a database of available photographs that is a part of knowledge base server 103 can be used as the basis of recommendations related to the filling of a gap or gaps in an existing sequence of images (taken either by the same photographer or different persons), in order to construct a panorama using the existing sequence of images and images taken from the available photographs.

In one embodiment, knowledge base server 103 can include a data base of timed events. In one embodiment, timed events from a database of timed events that is a part of knowledge base server 103 can be used as the basis for recommendations to a photograph taker. For example, a camera can access a database of timed events in order to obtain assistance with choosing an optimal image capturing moment. A more specific example includes but is not limited to a notification to a user that it is presently the season for a rare fruit to which he/she may want to pay attention. If time critical events are imminent (for example, the passing of a particular fast-moving race car that is of interest) the camera may also aid in timing the shot.

In one embodiment, knowledge base server 103 can include a data base of the locations of all images taken previously. In one embodiment, the data base of the locations of all images taken previously, that is a part of knowledge base server 103 can be used to provide recommendations. For example, knowledge base can store the locations of all the images taken previously, and use this information to guide the user to the same place/direction. In one embodiment, a tactile force feedback can be used to guide the user to that location.

In one embodiment, recommendations that involve changing a photographer's location and viewing direction can be useful in at least three different settings: a) choosing a popular place to photograph a landmark, b) choosing an unusual place from which to shoot the landmark in order to produce a unique image, and c) finding the location where some well-known photograph or painting were taken. Recommendations related to changing the lighting for an intended photograph can involve either utilizing a controlled flash or delaying taking the intended photograph for a different time, e.g. with a different location of the sun.

An advantage of exemplary embodiments is the capacity to improve the resulting image before or at the time of capture, rather than afterwards. In this manner, exemplary embodiments provide users with useful guidance that can ensure that fleeting photographic opportunities are not lost.

Operation

FIG. 1B illustrates operations A-G performed in a guided photography process according to one embodiment. These operations including the order in which they are presented are only exemplary. In other embodiments, other operations in other orders can be included.

At A, a scene is imaged by image capturing device 101. In one embodiment, the scene that is imaged by image capturing device 101 is shown in the viewfinder of image capturing device 101. In one embodiment, the scene shown in the viewfinder of image capturing device 101 along with data provided by image capturing device 101 itself, can be used to identify information in knowledge base server 103 that can be used to determine recommendations.

At B, an indication that the scene imaged at A is desired as the basis for a photograph is made. In one embodiment, this identifies the scene in the viewfinder as the basis of an "intended photograph." In one embodiment, the indication can be made by maintaining the scene imaged at A in the viewfinder for a predetermined time. In another embodiment, the indication can be made by manipulating a structure that is appurtenant image capturing device 101. In one embodiment, there may be no need for the aforementioned indication that a scene is desired as a basis for a photograph, for example where the device continuously maintains the information (e.g., such as from knowledge base server 103).

At C current image capturing device parameters and/or sensory data obtained from a source of sensor data are provided to system 107. And at D, based on current parameters and/or sensory data and the content of the intended photograph (the information discussed above with reference to FIG. 1A) identified at B, a search of knowledge base server 103 is performed from which information is obtained upon which system 107 determines recommendations related to the intended photograph.

At E recommendations are determined by system 107 and made available to image capturing device 101 at F. Thereafter, recommendations are presented to the user of image capturing device 101 such as on the viewfinder of image capturing device 101 at G. After recommendations have been presented to the user, the user may take photographs based on the recommendations made by system 107.

SPECIFIC EXAMPLES OF OPERATION

Example 1: Consider a person desiring to photograph the Chrysler Building located in New York. In one embodiment, system 107, based on its knowledge of the current position (as determined by GPS, cellular phone tower, etc.) and orientation of image capturing device 101, can recommend a nearby location that is known to provide a better vantage point for the desired photograph. In one embodiment, this estimation can be based on the knowledge base server 103 photographs that indicate that the recommended vantage point has been used before to create a high quality photograph of the landmark. Moreover, image capturing device 101 can provide a side-by-side presentation of the shots: (1) from the current location and (2) from the recommended location, for the user to compare for decision purposes.

In addition, in one embodiment, system 107 can recommend delaying the taking of a photograph of the Chrysler Building until a specific hour (e.g., because most of the photographs in knowledge base server 103 that captured this scene, in the same time of year, were taken at the recommended hour because the scene is especially beautiful at this time).

Example 2: Consider a person desiring to photograph the framed Half Dome located at Yosemite National Park. In one embodiment, system 107 can advise the person that a famous photograph of Half Dome was taken by framed photographer Ansel Adams from a nearby location. In one embodiment, this information can be provided as users may want to be advised of locations from which famous photographs of a scene that they are photographing was taken. This information may result in a personal photograph that possesses desirable qualities that are similar to qualities possessed by the famous photograph.

Example 3: Consider a person desiring to photograph a flower. In one embodiment, system 107, using the gist of the captured scene, can perform a search of a database of high quality photographs or paintings, for photographs or paintings that have a roughly similar outline. In one embodiment, based on information provided by the aforementioned search, a recommendation that the viewfinder be moved (left, right, up, down, angle, etc.) can be provided in order that a desirable scene composition can be achieved.

Exemplary Cell Phone Embodiment

Figure 2:
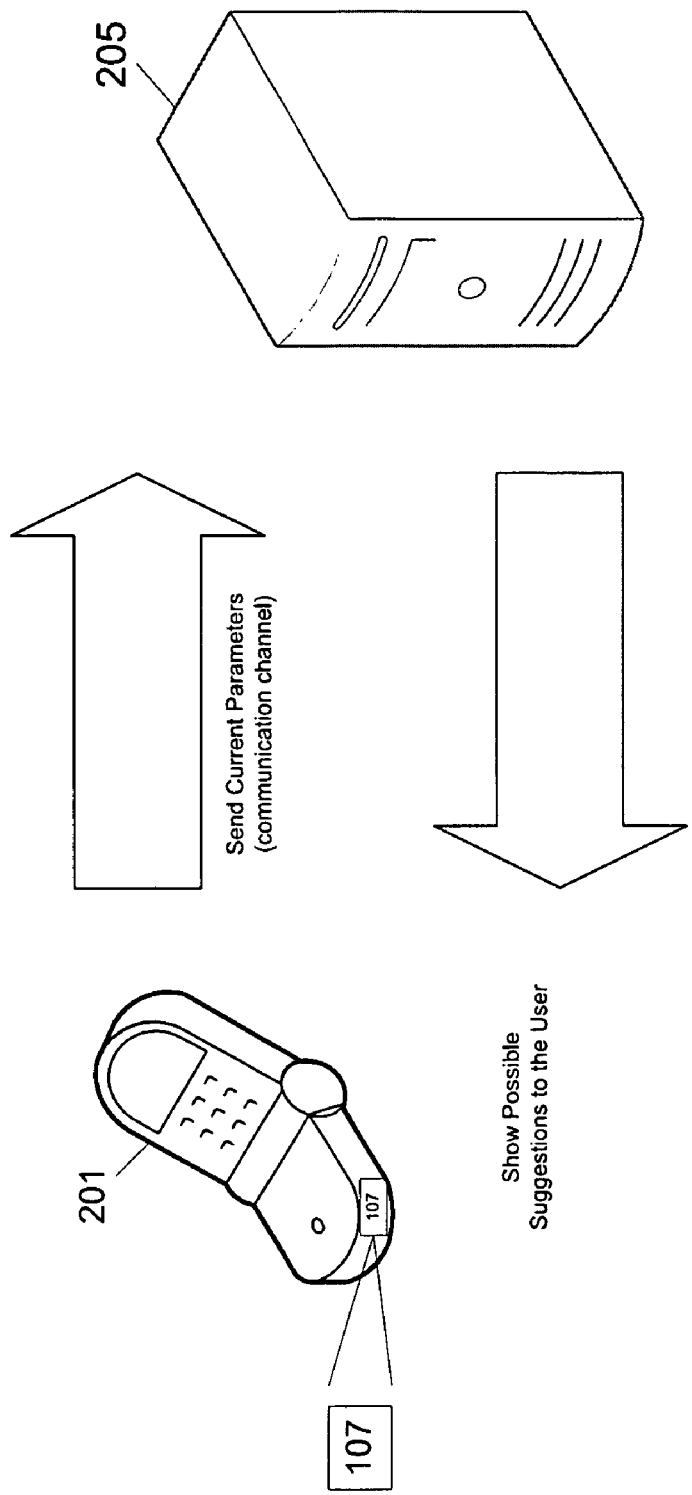
FIG. 2 is a block diagram that illustrates elements and operations of an exemplary operating setting for a system for guided photography embodied in a cell phone according to one embodiment.

FIG. 2 is a block diagram that illustrates elements and operations of an exemplary operating setting for a system 107 for guided photography embodied in a cell phone according to one embodiment. In one embodiment, system 107 can be embodied in a cell phone that features an integrated camera system. FIG. 2 shows cell phone/camera 201 and server 205.

Referring to FIG. 2, in one embodiment, cellphone/camera 201 possesses two-way communication capability (e.g., wireless, Bluetooth, wired etc.) and maintains a wealth of information that can be useful in determining recommendations for intended photographs, such as the current time and location of cellphone/camera 201. In operation, as shown in FIG. 2, when a user indicates an intent to take a photograph, cellphone/camera 201 can send its current parameters to server 205, which can include but is not limited to data related to cellphone/camera 201 location, orientation, time and date.

In addition, alongside the aforementioned current parameters that are sent to server 205, cellphone/camera 201 can send the image shown on the viewfinder of cellphone/camera 201 to server 205. In one embodiment, server 205 can search for possible improvements to an intended photograph based on the information that it receives. In response, system 107 can access the results of the search and use these results as a basis for recommendations for possible improvements to an intended photograph.

For example, given the current position of cellphone/camera 201, system 107 can recommend known nearby vantage points from which to take an intended photograph. As discussed above, if a user desires to take a photograph similar to a famous one that is stored on server 205, the famous photograph can be retrieved and used as a basis for recommendations presented to the user. In another embodiment, a user may be interested in a unique photograph. In such cases, server 205 under the direction of system 107 can supply information to the user concerning the number of photographs that have been taken that are similar to the intended photograph.

In one embodiment, a network connection can be used to access relied upon information from server 205. In another embodiment, relied upon information can be stored locally.

Figure 3:
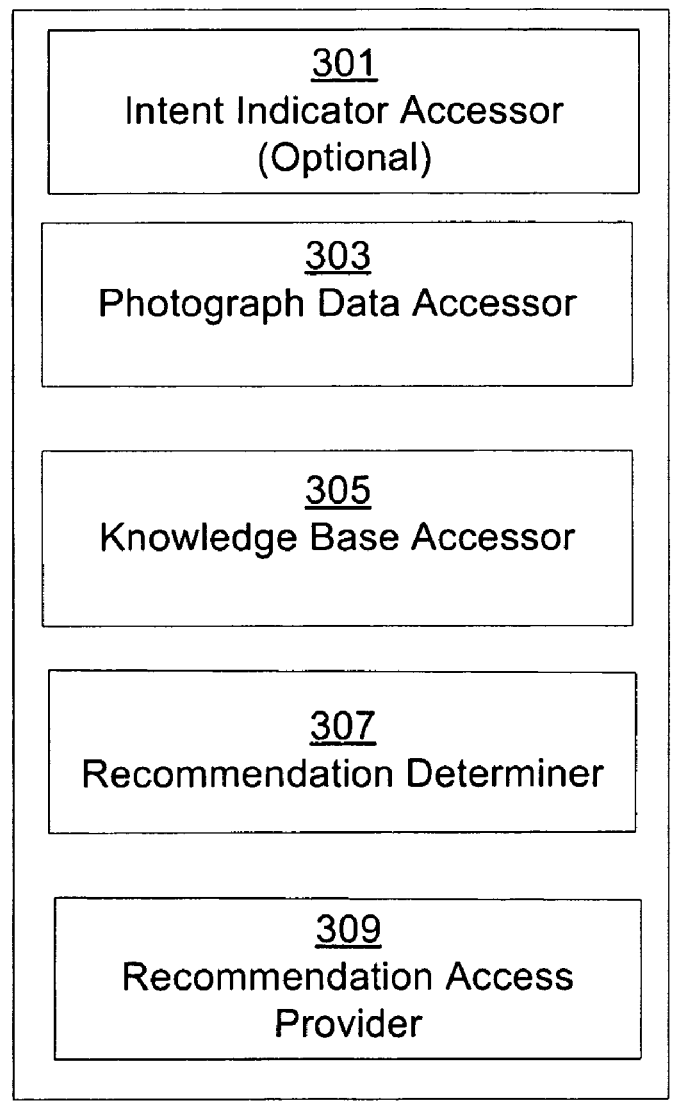
FIG. 3 is a block diagram that shows components of a system for guided photography according to one embodiment.

System for Guided Photography Based on Image Capturing Device Rendered User Recommendations According to Embodiments FIG. 3 shows components of a system 107 for guided photography based on image capturing device rendered recommendations according to one embodiment. In one embodiment, system 107 implements an algorithm for guiding the taking of a photograph. In the FIG. 3 embodiment, system 107 includes intent indicator accessor 301 (optional), photograph data accessor 303, knowledge base accessor 305, recommendation determiner 307, recommendation access provider 309.

It should be appreciated that aforementioned components of system 107 can be implemented in hardware or software or in a combination of both. In one embodiment, components and operations of system 107 can be encompassed by components and operations of one or more application programs (e.g. program on-board image capturing device 101 of FIG. 1A). In another embodiment, components and operations of system 107 can be separate from the aforementioned one or more application programs but can operate cooperatively with components and operations thereof.

Referring to FIG. 3, intent indicator accessor 301 (optional) accesses an indicator of an image capturing device user's intent to take a photograph. In one embodiment, intent indicator accessor 301 can be optional as there may be no need for the aforementioned indicator where, for example system 107 continuously gathers information (e.g., from a knowledge base), in the absence of an indicator, upon which to base recommendations. In another embodiment, modes where an indicator is accessed and where information is continuously gathered can be utilized either separately or in tandem.

In one embodiment, the intent to take a photograph can be shown by manipulating a physical mechanism appurtenant the body of the image capturing device (e.g., depressing a button, partially depressing a button, etc.). In another embodiment, the intent to take a photograph can be shown by maintaining an imaged scene in the viewfinder of an image capturing device for a predetermined period of time. In other embodiments, other manners of showing the intent to take a photograph can be performed.

Photograph data accessor 303 accesses data from an image capturing device related to the taking of an intended photograph (e.g., taking of a photograph, image capture etc.). In one embodiment, the accessed data related to the taking of a photograph can include but is not limited to the imaged scene in view finder, time, place, location, lighting, existing camera settings, subject location, camera angle and/or data provided by a sensory source of data.

Knowledge base accessor 305 accesses a knowledge base to obtain information upon which recommendations for an intended photograph are made. In one embodiment, knowledge base accessor 305 can access the knowledge base to identify photographs or other information upon which recommendations for an intended photograph can be made. In one embodiment, knowledge base accessor 305 can access the contents of the knowledge base via a search of the knowledge base. In one embodiment, a search can be based on automatically executed queries or criteria such as "all photographs in knowledge base that are compositionally related to the intended photograph," and "famous photographs of subject of intended photograph."

Recommendation determiner 307 accesses the information identified by knowledge base accessor 305 and based upon such information determines one or more recommendations for an intended photograph. In one embodiment, recommendation determiner 305 can utilize an algorithm to determine recommendations. In one embodiment, executing the algorithm can cause the identification of desirable qualities or features of identified photographs such as their vantage point, lighting, composition, etc., that are different from their counterparts in the intended photograph and direct the presentation of the identified desirable qualities or features as recommendations for an intended photograph to a camera user.

Recommendation access provider 309 provides access to recommendations to image capturing device rendering systems such as camera audio and/or visual presentation systems. In one embodiment, the recommendations can be presented in the viewfinder of the image capturing device. In another embodiment, the recommendations can be presented as audio outputs of the image capturing device.

Figure 4:
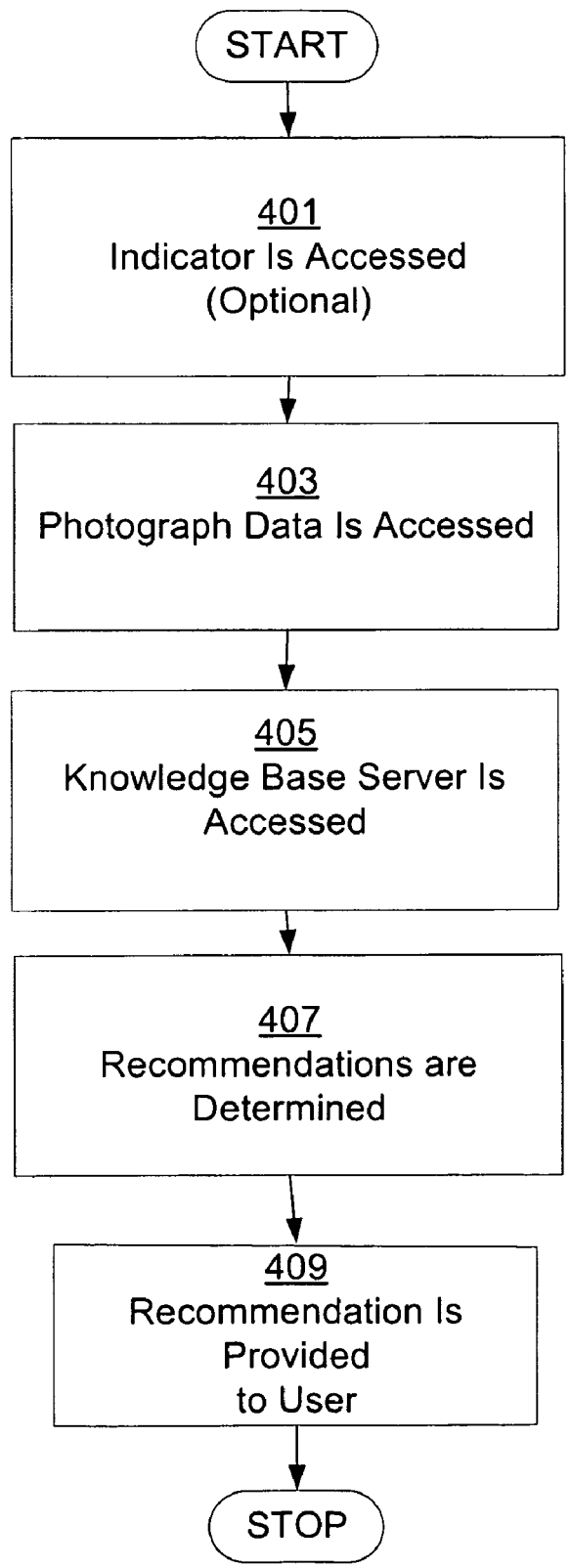
FIG. 4 shows a flowchart of the steps performed in a method for guided photography based on image capturing device rendered user recommendations according to one embodiment.

Exemplary Operations of System for Guided Photography Based on Image Capturing Device Rendered User Recommendations According to Embodiments FIG. 4 shows a flowchart 400 of the steps performed in a method for guided photography based on image capturing device rendered user recommendations according to one embodiment. The flowchart includes processes that, in one embodiment can be carried out by processors and electrical components under the control of computer-readable and computer-executable instructions. Although specific steps are disclosed in the flowcharts, such steps are exemplary. That is the present invention is well suited to performing various other steps or variations of the steps recited in the flowchart. Within various embodiments, it should be appreciated that the steps of the flowchart can be performed by software, by hardware or by a combination of both.

Referring to FIG. 4, at step 401 (optional) an indicator of an image capturing device user's intent to take a photograph is accessed (see discussion below). At step 403, data related to the intended photograph is accessed. At step 405, a knowledge base is accessed to obtain information upon which recommendations for an intended photograph are based. It should be appreciated that, step 401 is optional as the herein described system (e.g., 107 in FIG. 1A) can operate in an "always on" mode wherein recommendations related to an intended photograph are continuously accessed from a knowledge base without the need for a user to register an intent to take a photograph. Thereafter, at step 407, one or more recommendations for the intended photograph are determined. And, at step 409, access is provided to the determined recommendations for presentation to an image capturing device user.

It should be appreciated that exemplary embodiments use prior knowledge as a basis for improving intended photographs. More specifically, the image capturing device uses available information as a basis for user recommendations regarding possible changes in location, parameters settings or a scene of an intended photograph in order to improve its quality. This approach is very different from conventional approaches that focus on improving existing photographs, e.g., by means of image processing.

Exemplary Hardware According to One Embodiment

Figure 5:
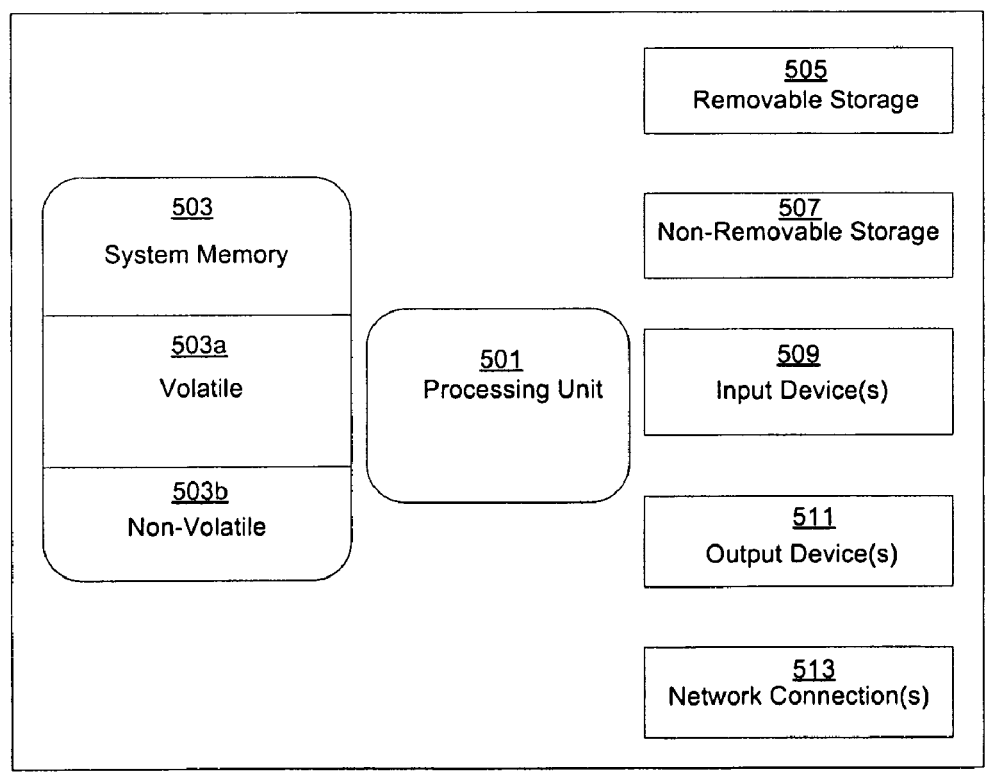
FIG. 5 is a block diagram that shows an exemplary computing device according to one embodiment.

FIG. 5 shows an exemplary computing device 500 according to one embodiment. Referring to FIG. 5, computing device 500 can be included as a part of an image capturing device (e.g., image capturing device 101 in FIG. 1A) and/or a knowledge base server (knowledge base server 103 in FIG. 1A) in accordance with one embodiment. Computing device 500 typically includes at least some form of computer readable media. Computer readable media can be any available media that can be accessed by computing device 500 and can include but is not limited to computer storage media.

In its most basic configuration, computing device 500 typically includes processing unit 501 and memory 503. Depending on the exact configuration and type of computing device 500 that is used, memory 503 can be volatile (such as RAM) 503a, non-volatile 503b (such as ROM, flash memory, etc.) or some combination of the two.

Additionally, computing device 500, especially the version that can be a part of knowledge base server 103 in FIG. 1A, can include mass storage systems (removable 505 and/or non-removable 507) such as magnetic or optical disks or tape. Similarly, computing device 500 can include input devices 509 and/or output devices 511 (e.g., such as a display). Additionally, computing device 500 can include network connections 513 to other devices, computers, networks, servers, etc. using either wired or wireless media. As all of these devices are well known in the art, they need not be discussed in detail.

With reference to exemplary embodiments thereof guided photography with image capturing device rendered user recommendations is disclosed. As a part of a disclosed method, data that is associated with the intended photograph is accessed. Thereafter, a knowledge base is accessed to obtain data that is related to the data that is associated with the intended photograph. Based on the obtained data recommendations are determined for the intended photograph. The recommendations are provided to a rendering system of the image capturing device for rendering before the intended photograph is taken.

Advantages provided by exemplary embodiments include improving the process of picture taking in situ, rather than an afterthought, the use of a knowledge base upon which to base recommended image capturing device settings (position, viewing direction, focal length, speed etc.), the use of image processing for analyzing composition in order to provide Immediate feedback to the user and the use of real-time data either from sensors on the device or elsewhere (for example, activity of other such devices or from a network).

The foregoing descriptions of specific embodiments have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for guided photography based on user recommendations rendered by an image capturing device, comprising:
accessing data that is associated with an intended photograph;
accessing a knowledge base to obtain knowledge data that is related to said data associated with said intended photograph;
determining one or more recommendations for said intended photograph based on said knowledge base data, the one or more recommendations including at least one item from a group consisting of: a simulation of lighting conditions at a suggested time, a recommendation to schedule a specific shot based on an image analysis comprising motion detection, and rendering a recommendation by highlighting objects comprising occluders that hide a subject of an intended photograph; and
providing access to said one or more recommendations to a rendering system of said image capturing device for rendering before said photograph is taken.

2. The method of claim 1 further comprising:
accessing an indicator of an intent to take a photograph wherein said indicator of said intent to take a photograph is provided in response to actions comprising maintaining a scene in a viewfinder of said image capturing device for a predetermined time, moving a physical component of said image capturing device or making a selection in the viewfinder.

3. The method of claim 1 wherein said data associated with said photograph includes current device parameters comprising device type, location, orientation, time and date and an image that is shown in a viewfinder of said image capturing device.

4. The method of claim 1 wherein said one or more recommendations further comprise changing a location and viewing direction from which a photograph is taken.

5. The method of claim 1 wherein one of said one or more recommendations relates to changing lighting for an intended photograph by controlling flash or waiting for a different location of a sun.

6. The method of claim 1 wherein one of said one or more recommendations relates to using a database of buildings and geometry wherein obstacles are made semi-transparent in a viewfinder of said image capturing device in order to show occluded objects in order to aid in deciding what to include in a photograph.

7. The method of claim 1 wherein said one or more recommendations further comprise a simulated view from a suggested location.

8. The method of claim 1 wherein said one or more recommendations further comprise a recommendation to fill a gap in an existing sequence of images in order to construct a panoramic image.

9. The method of claim 1 wherein said one or more recommendations further comprise a recommendation suggesting a specific time to take said intended photograph or to take a series of photographs.

10. A computer useable medium having computer-executable components for causing an image capturing device to perform a method comprising:
accessing data that is associated with an intended photograph;
accessing a knowledge base to obtain knowledge base data that is related to said data associated with said intended photograph;
determining one or more recommendations for said intended photograph based on said knowledge base data, said one or more recommendations including at least one item from a group consisting of: a simulation of lighting conditions at a suggested time, a recommendation to schedule a specific shot based on an image analysis comprising motion detection, and rendering a recommendation by highlighting objects comprising occluders that hide a subject of an intended photograph; and
providing access to said one or more recommendations to a rendering system of an image capturing device for rendering before and during a taking of a photograph.

11. The medium of claim 10, wherein the method further comprises:
accessing an indicator of an intent to take a photograph wherein said indicator of said intent to take a photograph is provided in response to actions comprising maintaining a scene in a viewfinder of said image capturing device for a predetermined time, moving a physical component of said image capturing device or making a selection in the viewfinder.

12. The medium of claim 10 wherein said data associated with said photograph includes current image capturing device parameters comprising device type, location, orientation, time and date and an image that is shown in a viewfinder of said image capturing device.

13. The medium of claim 10 wherein said one or more recommendations further comprise a recommendation to change an intended photograph location and viewing direction.

14. An image capturing device comprising:
an optical element;
a sensor coupled to said optical element; and
a processor coupled to said sensor, said processor for executing operations of a method for guided photography, comprising:
accessing data that is associated with an intended photograph;
accessing a knowledge base to obtain knowledge base data that is related to said data associated with said intended photograph;
determining one or more recommendations for said intended photograph based on said knowledge base data, the one or more recommendations including at least one item from a group consisting of: a simulation of lighting conditions at a suggested time, a recommendation to schedule a specific shot based on an image analysis comprising motion detection, and rendering a recommendation by highlighting objects comprising occluders that hide a subject of an intended photograph; and
providing access to said one or more recommendations to a rendering system of said image capturing device for rendering before said photograph is taken.

15. The image capturing device of claim 14 further comprising:
accessing an indicator of an intent to take a photograph wherein said indicator of said intent to take a photograph is provided in response to actions comprising maintaining a scene in a viewfinder of said image capturing device for a predetermined time, moving a physical component of said image capturing device or making a selection in the viewfinder.

16. The image capturing device of claim 14 wherein said data is selected from a group consisting of current device parameters comprising device type, location, orientation, time and date and an image shown in a viewfinder of said image capturing device.

17. The image capturing device of claim 14 wherein said data is used to capture a collection or sequence of images.

18. The method of claim 1, wherein the knowledge base resides on a knowledge base server that connects to one or more information sources.

19. The method of claim 1, wherein the knowledge base includes a database of known 3D geometry.

20. The method of claim 1, further comprising:
capturing said photograph by an image capturing device included in a cellular phone.

* * * * *